United States Patent
Ohkimoto et al.

(10) Patent No.: US 11,228,075 B2
(45) Date of Patent: Jan. 18, 2022

(54) POROUS INSULATOR, ELECTRODE, AND NONAQUEOUS POWER STORAGE ELEMENT

(71) Applicant: RICOH COMPANY, LTD., Tokyo (JP)

(72) Inventors: Miku Ohkimoto, Kanagawa (JP); Hideo Yanagita, Tokyo (JP); Keigo Takauji, Kanagawa (JP); Masahiro Masuzawa, Kanagawa (JP); Yuu Zama, Kanagawa (JP); Okitoshi Kimura, Kanagawa (JP); Hiromitsu Kawase, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 76 days.

(21) Appl. No.: 16/351,161

(22) Filed: Mar. 12, 2019

(65) Prior Publication Data
US 2019/0288259 A1    Sep. 19, 2019

(30) Foreign Application Priority Data

Mar. 15, 2018  (JP) .............................. JP2018-048205
Jan. 11, 2019  (JP) .............................. JP2019-003694

(51) Int. Cl.
*H01M 50/46*  (2021.01)
*H01M 10/0585*  (2010.01)
(Continued)

(52) U.S. Cl.
CPC ............ *H01M 50/46* (2021.01); *H01G 11/22* (2013.01); *H01G 11/52* (2013.01); *H01M 4/13* (2013.01);
(Continued)

(58) Field of Classification Search
CPC ............ H01M 2/1653; H01M 2/1673; H01M 2/1686; H01M 2/18; H01M 4/13;
(Continued)

(56) References Cited

U.S. PATENT DOCUMENTS 6,413,667 B1 *  7/2002  Gozdz ............... H01M 10/0585
                                                              429/62
2007/0264577 A1 * 11/2007  Katayama ........... H01M 2/1646
                                                              429/246
(Continued)

FOREIGN PATENT DOCUMENTS

JP  2010170770 A  *  8/2010
JP  2017-119442      7/2017
WO  WO2006/062153 A1  6/2006

OTHER PUBLICATIONS

EPO website (www.espacenet.com) machine translation of the detailed description of JP-2010170770-A (Year: 2010).*
(Continued)

*Primary Examiner* — Gregg Cantelmo
(74) *Attorney, Agent, or Firm* — Grüneberg and Myers PLLC

(57) ABSTRACT

A porous insulator is provided. The porous insulator comprises a porous structure comprising a polymer compound having communicating pores, and a solid having a melting point or glass transition temperature lower than that of the polymer compound.

20 Claims, 4 Drawing Sheets

(51) Int. Cl.
| | |
|---|---|
| *H01M 10/42* | (2006.01) |
| *H01M 10/0525* | (2010.01) |
| *H01M 4/131* | (2010.01) |
| *H01M 4/62* | (2006.01) |
| *H01M 4/13* | (2010.01) |
| *H01G 11/22* | (2013.01) |
| *H01G 11/52* | (2013.01) |
| *H01M 50/411* | (2021.01) |
| *H01M 50/463* | (2021.01) |
| *H01M 50/443* | (2021.01) |
| *H01M 50/417* | (2021.01) |
| *H01M 50/426* | (2021.01) |
| *H01M 50/489* | (2021.01) |
| *H01M 50/491* | (2021.01) |

(52) U.S. Cl.
CPC ............. *H01M 4/131* (2013.01); *H01M 4/62* (2013.01); *H01M 10/0525* (2013.01); *H01M 10/0585* (2013.01); *H01M 10/4235* (2013.01); *H01M 50/411* (2021.01); *H01M 50/417* (2021.01); *H01M 50/426* (2021.01); *H01M 50/443* (2021.01); *H01M 50/463* (2021.01); *H01M 50/489* (2021.01); *H01M 50/491* (2021.01)

(58) Field of Classification Search
CPC .... H01M 4/131; H01M 4/62; H01M 10/0525; H01M 10/0585; H01M 10/4235; H01M 50/417; H01M 50/426; H01M 50/443; H01M 50/46; H01M 50/463; H01M 50/489; H01M 50/491; H01G 11/22; H01G 11/52
See application file for complete search history.

(56) References Cited

U.S. PATENT DOCUMENTS

| | | | |
|---|---|---|---|
| 2009/0208842 A1* | 8/2009 | Harada | B01D 71/26 429/209 |
| 2012/0156568 A1* | 6/2012 | Kia | H01M 50/463 429/246 |
| 2018/0261827 A1 | 9/2018 | Yanagita et al. | |

OTHER PUBLICATIONS

Yang et al. "Membranes in Lithium Ion Batteries", Membranes 2012, 2, pp. 367-383; doi:10.3390/membranes2030367. (Year: 2012).*

* cited by examiner

POROUS INSULATOR, ELECTRODE, AND NONAQUEOUS POWER STORAGE ELEMENT

CROSS-REFERENCE TO RELATED APPLICATIONS

This patent application is based on and claims priority pursuant to 35 U.S.C. § 119(a) to Japanese Patent Application Nos. 2018-048205 and 2019-003694, filed on Mar. 15, 2018 and Jan. 11, 2019, respectively, in the Japan Patent Office, the entire disclosure of each of which is hereby incorporated by reference herein.

BACKGROUND

Technical Field

The present disclosure relates to a porous insulator, an electrode, and a nonaqueous power storage element.

Description of the Related Art

A lithium ion secondary battery causes thermal runaway and abnormal heat generation in some cases when the cathode and the anode are short-circuited due to breakage or the like. To prevent thermal runaway, it is effective to give a shape maintaining function to the battery that suppresses heat shrinkage to prevent a short circuit between the cathode and the anode, and to provide a separator having a shutdown function in the battery that disturbs the battery reaction by thermal deformation.

Conventionally, a polyolefin microporous film having a melting point around 150 degrees C. has been mainly used as a separator.

However, the polyolefin microporous film is likely to shrink upon thermal deformation, due to the strain generated at the time of forming the pores, so that the cathode and the anode are likely to be short-circuited.

SUMMARY

In accordance with some embodiments of the present invention, a porous insulator is provided. The porous insulator comprises a porous structure comprising a polymer compound having communicating pores, and a solid having a melting point or glass transition temperature lower than that of the polymer compound.

In accordance with some embodiments of the present invention, an electrode is provided. The electrode includes an electrode substrate, an electrode mixture overlying the electrode substrate, and the above-described porous insulator overlying the electrode mixture. The electrode mixture comprises an active material.

In accordance with some embodiments of the present invention, a nonaqueous power storage element comprising the above-described electrode is provided.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
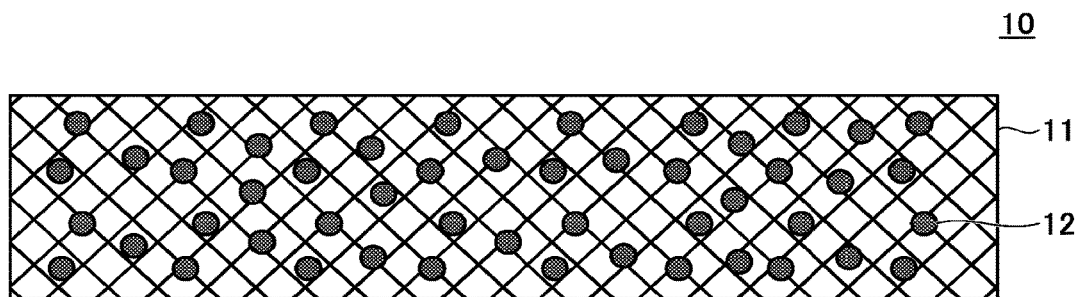
FIG. 1 is a schematic cross-sectional view of a porous insulator according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Within the context of the present disclosure, if a first layer is stated to be "overlaid" on, or "overlying" a second layer, the first layer may be in direct contact with a portion or all of the second layer, or there may be one or more intervening layers between the first and second layer, with the second layer being closer to the substrate than the first layer.

A separator for electrochemical elements which comprises a porous substrate and a porous film comprising a resin has been proposed. The porous substrate has a heat resistant temperature of 150 degrees C. or higher and contains filler particles. The resin has a melting point in the range of from 80 to 130 degrees C.

This separator contains the filler particles and the resin, as described above. Generally, when filler particles which are likely to take a closest packing structure and a resin which blocks pores are used in combination, communicability of the separator is likely to decrease. As a result, ion permeability of the separator decreases, and therefore input-output characteristics of the lithium ion secondary battery deteriorates, and durability thereof decreases by overvoltage or the like.

According to an embodiment of the present invention, a porous insulator having high communicability, a shape maintaining function, and a shutdown function is provided.

Porous Insulator and Electrode

FIG. 1 is a schematic cross-sectional view of a porous insulator according to an embodiment of the present invention.

A porous insulator 10 comprises a porous structure 11 and a solid 12. The porous structure 11 has communicating pores and comprises a polymer compound. The solid 12 has a melting point or a glass transition temperature lower than that of the polymer compound. Since the porous structure 11 is formed of the polymer compound without using filler particles, a high porosity is readily given thereto. As a result, the porous insulator 10 has high communicability. Further, when the porous insulator 10 is heated up to the melting point (or glass transition temperature) of the solid 12, the solid 12 turns into a liquid (or rubber state) but the polymer compound does not turn into a liquid (or rubber state) due to the difference in melting point (or glass transition temperature) between the polymer compound and the solid 12, thereby maintaining the shape of the porous structure 11. Accordingly, the porous insulator 10 provides a shape maintaining function and a shutdown function. Since the pores in the porous insulator 10 are communicating with each other, the solid 12 tuned into a liquid (or rubber state) can move within the pores, thereby improving the shutdown function of the porous insulator 10.

In the present disclosure, the melting point or the glass transition temperature of the solid 12 is compared with either the melting point or the glass transition temperature of the polymer compound. In other words, the solid 12 and the polymer compound are compared in terms of temperature at which when they transit from a solid state to a liquid state or a glass state. Therefore, "the solid 12 having a melting point or a glass transition temperature lower than that of the polymer compound" refer to the following four cases:

1) The melting point of the solid 12 is lower than the melting point of the polymer compound;
2) The melting point of the solid 12 is lower than the glass transition temperature of the polymer compound;
3) The glass transition temperature of the solid 12 is lower than the melting point of the polymer compound; and
4) The glass transition temperature of the solid 12 is lower than the glass transition temperature of the polymer compound.

The porous insulator 10 is applicable to electrodes of nonaqueous storage elements such as lithium ion secondary batteries and nickel hydrogen secondary batteries, power generation elements such as fuel cells and solar cells, and the like.

Figure 2:
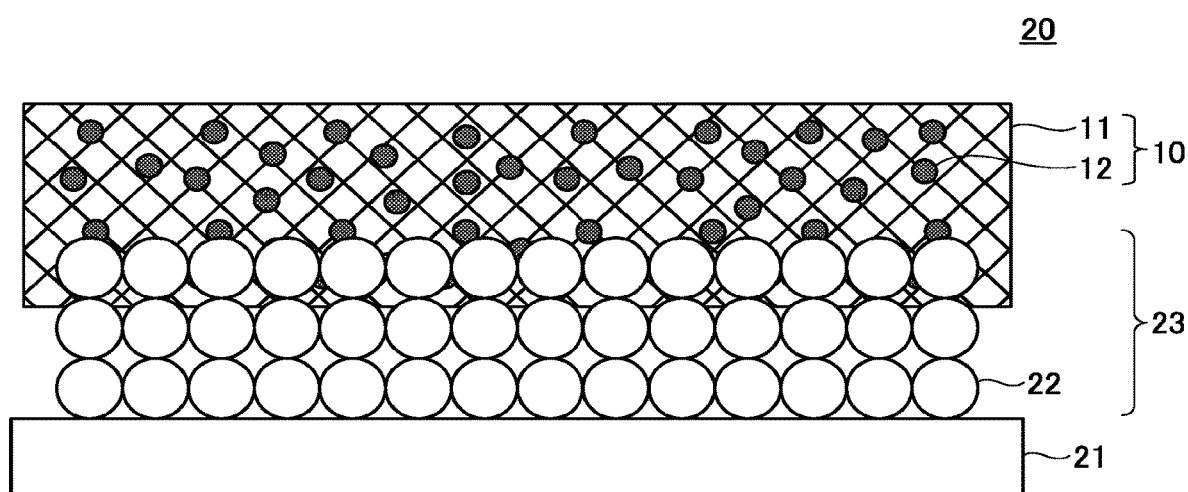
FIG. 2 is a schematic cross-sectional view of an electrode according to an embodiment of the present invention.

FIG. 2 is a schematic cross-sectional view of an electrode according to an embodiment of the present invention, including the porous insulator 10.

An electrode 20 comprises an electrode substrate 21, an electrode mixture 23 overlying the electrode substrate 21, and the porous insulator 10 overlying the electrode mixture 23. The electrode mixture 23 comprises an active material 22. A part of the porous insulator 10 is present in a part of the electrode mixture 23. Therefore, the bonding strength between the electrode mixture 23 and the porous insulator 10 is improved. This configuration makes the active material 22 hardly separate from the electrode 20 when an impact such as vibration is externally applied thereto. Therefore, a nonaqueous power storage element containing the electrode 20 has an improved durability. In addition, when a conductor such as a nail penetrates the nonaqueous power storage element containing the electrode 20, a short circuit between the cathode and the anode hardly occurs, so that the safety of the nonaqueous power storage element is improved.

In the electrode 20, as described above, a part of the porous insulator 10 is present in a part of the electrode mixture 23, in other words, a part of the porous insulator 10 is integrated with the surface of the active material constituting the electrode mixture 23. Here, the integration refers to not only a state in which a film-like member as an upper layer is stacked on a lower layer but also a state in which a part of an upper layer intrudes into a lower layer so that the surface of an upper material constituting the upper layer and the surface of a lower material constituting the lower layer are bonded without forming a clear interface between the upper layer and the lower layer.

In the accompanied drawings, the electrode mixture 23 is schematically drawn in a structure in which spherical particles are stacked, for the purpose of illustration. However, the particles constituting the electrode mixture 23 may be either spherical or non-spherical and may be of a mixture of particles with various shapes and sizes.

In the electrode mixture 23, the region where the porous insulator 10 is present preferably accounts for 0.5% or more, more preferably 1.0% or more, of the electrode mixture 23 from the surface thereof in a depth direction.

Note that a part of the porous insulator 10 may not be present in a part of the electrode mixture 23.

Next, the shape maintaining function and the shutdown function of the porous insulator 10 are described below with reference to FIGS. 3A to 3D.

In general, there is a case in which excess current flows in a nonaqueous power storage element due to the occurrence of abnormal charge or discharge or the like, and abnormal heat generation thereby occurs. In such a case, the electrode 20 is capable of suppressing abnormal heat generation.

Figure 3A:
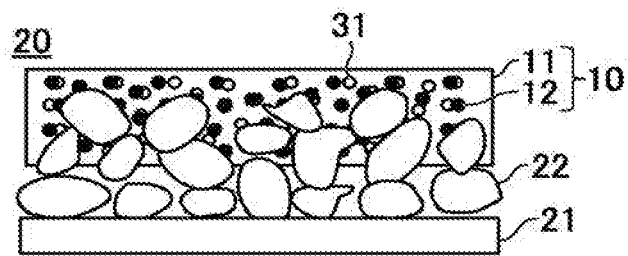
FIGS. 3A to 3D are schematic diagrams for explaining a shape maintaining function and a shutdown function of the porous insulator illustrated in FIG. 1.
Figure 3B:
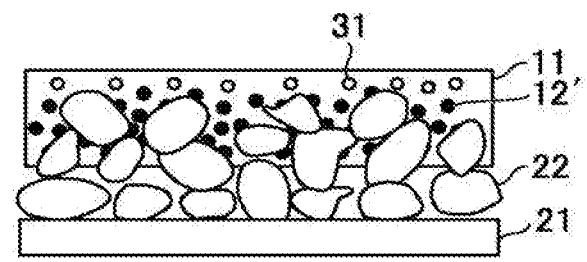

Specifically, in a case in which the pore diameter of the porous structure 11 is smaller than the particle diameter of the solid 12 (see FIG. 3A), pores 31 are blocked as the solid 12 turns into a liquid 12' by heating (see FIG. 3B). As a result, ions present in a nonaqueous electrolytic solution are prevented from moving in the communicating pores 31, and the progress of an electrochemical reaction in the nonaqueous power storage element is suppressed. As a result, current flow is interrupted, and temperature rise is suppressed. Since temperature rise gradually progresses for a certain period of time after the solid 12 has turned into the liquid 12', the liquid 12' moves inside the communicating pores 31 and becomes connected with each other, exhibiting a more effective shutdown function. Further, it is possible that the liquid 12' adheres to the surrounding of the active material 22 present in the porous insulator 10 (see FIG. 3C). In this case, the nonaqueous electrolytic solution is prevented from contacting the active material 22 and temperature rise is suppressed. On the other hand, when the internal temperature of the nonaqueous power storage element reaches 160 degrees C. or higher depending on the surrounding environment such as a high temperature environment, an electrochemical reaction between the anode and the nonaqueous electrolytic solution proceeds due to decomposition of an SEI coating. When the temperature thereafter reaches 180 degrees C. or higher, an electrochemical reaction between the cathode and the nonaqueous electrolytic solution proceeds. When such a thermal runaway reaction progresses, the temperature rises rapidly and reaches 200 degrees C. or higher. Even at a temperature at which the solid 12 turns into the liquid 12', the porous structure 11 maintain its shape without turning into a liquid, i.e., without thermally shrinking, thereby preventing a short circuit between the cathode and the anode.

Figure 3C:
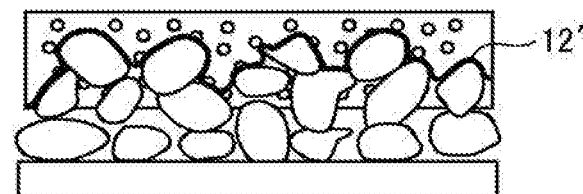
Figure 3D:
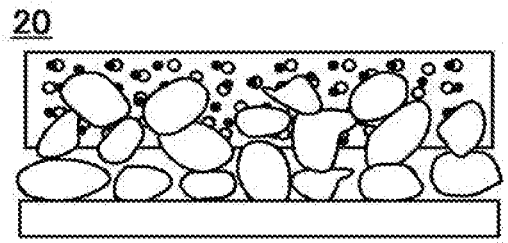

In a case in which the pore diameter of the porous structure 11 is larger than the particle diameter of the solid 12 (see FIG. 3D), the solid 12 tuned into the liquid 12' by heating moves inside the communicating pores 31 and adheres to the surrounding of the active material 22 present in the porous insulator 10 (see FIG. 3C). In this case, the nonaqueous electrolytic solution is prevented from contacting the active material 22 and temperature rise is suppressed.

The melting point or glass transition temperature of the polymer compound is preferably 160 degrees C. or higher, more preferably 200 degrees C. or higher, for the shape maintaining function of the porous insulator 10.

The existence distribution of the porous structure 11 and the solid 12 in the porous insulator 10 is not particularly limited and can be appropriately designed according to required characteristics of the nonaqueous power storage element. For example, as illustrated in FIG. 1, the solid 12 may be uniformly dispersed in the porous structure 11. Alternatively, the distribution of the solid 12 may be non-uniform such that the solid 12 is locally present in the porous structure 11.

Next, the difference in melting point or glass transition temperature between the polymer compound and the solid 12 is described below.

When excessive current flows in the nonaqueous power storage element due to the occurrence of abnormal charge or discharge or the like and the nonaqueous power storage element generates heat, the solid 12 turns into the liquid 12' and blocks the communicating pores 31 in the porous insulator 10. As a result, current flow is interrupted, so that temperature rise is suppressed. However, after the solid 12 has tuned into the liquid 12', temperature rise slowly progresses inside the nonaqueous power storage element for a certain period of time, so that the shape of the porous structure 11 should be maintained to prevent a short circuit between the cathode and the anode. If the difference in melting point or glass transition temperature between the polymer compound and the solid 12 is too small, it is difficult to prevent a short circuit between the cathode and the anode. Therefore, the difference in melting point or glass transition temperature between the polymer compound and the solid 12 is preferably 20 degrees C. or more, and more preferably 50 degrees C. or more.

The pore diameter of the porous insulator 10 is preferably from 0.1 to 10 μm, and more preferably from 0.1 to 1.0 μm. When the pore diameter of the porous insulator 10 is 0.1 μm or more, nonaqueous electrolytic solution permeability and ion permeability of the porous insulator 10 are improved and a reaction efficiently progresses inside the nonaqueous power storage element. When the pore diameter of the porous insulator 10 is 10 μm or less, a short circuit between the cathode and the anode caused by generation of lithium dendrite inside the nonaqueous power storage element can be prevented and safety of the nonaqueous power storage element is improved.

The porosity of the porous insulator 10 is preferably from 30% to 90%, and more preferably from 50% to 85%. When the porosity of the porous insulator 10 is 30% or more, communicability of the porous insulator 10 is improved, so that nonaqueous electrolytic solution permeability and ion permeability thereof are improved and a reaction efficiently progresses inside the nonaqueous power storage element. When the porosity of the porous insulator 10 is 85% or less, the strength of the porous insulator 10 is improved and the porous insulator 10 hardly breaks even when an impact such as vibration is externally applied thereto.

The polymer compound is not particularly limited as long as it has a melting point or glass transition temperature higher than that of the solid 12. Examples thereof include, but are not limited to, aramid, polyamideimide, polyimide, and cellulose.

Each of these polymer compounds can be used alone or in combination with others.

It is preferable that the polymer compound has a cross-linked structure for the shape maintaining function of the porous insulator 10. When the polymer compound has a cross-linked structure, chemical resistance and strength can be controlled by controlling the cross-linking density.

In a case in which the polymer compound has a cross-linked structure, the porous structure 11 is not particularly limited. However, for the shutdown function, the porous structure 11 is preferably of a bicontinuous structure having a backbone comprising a three-dimensional branched network structure of the polymer compound.

Examples of such a porous structure 11 include, but are not limited to, a bicontinuous structure called a monolith structure in which a carbon backbone is in a three-dimensional network structure.

In the present disclosure, when the polymer compound having a cross-linked structure has neither melting point nor glass transition temperature, it is assumed that the melting point or glass transition temperature thereof is higher than that of the solid 12.

Preferably, the solid 12 is electrically insulating, stable with respect to a nonaqueous electrolytic solution, and comprised of an electrochemically stable material to be hardly oxidized or reduced by a voltage applied when incorporated in a nonaqueous power storage element.

The solid 12 is not particularly limited as long as its melting point or glass transition temperature is lower than that of the polymer compound. The solid 12 may be either a high-molecular-weight compound or a low-molecular-weight compound (e.g., ethylene carbonate).

The melting point or glass transition temperature of the solid 12 is preferably from 80 to 200 degrees C., and more preferably from 110 to 160 degrees C. When the melting point or glass transition temperature of the solid 12 is 80 degrees C. or higher, the power storage element can be used regardless of the use environment, since the shutdown function does not appear unless the inner temperature of the nonaqueous power storage element reaches an abnormal temperature depending on the external environment. When the melting point or glass transition temperature of the solid 12 is 200 degrees C. or lower, the shutdown function can appear at the initial stage of abnormal generation of heat by the nonaqueous power storage element, improving safety of the nonaqueous power storage element.

The shape of the solid 12 is not particularly limited as long as it does not significantly interfere with the communicability of the pores 31 of the porous insulator 10.

For easy control of the melting point or glass transition temperature by molecular structure, the solid 12 is preferably comprised of resin particles. In this case, the melting point or glass transition temperature of the solid 12 can be optimized in consideration of safety of the nonaqueous power storage element, thereby improving the shutdown function of the porous insulator 10.

Examples of the resin constituting the resin particles include, but are not limited to, polyethylene (PE), modified polyethylene, polypropylene, paraffin, copolymerized polyolefin, polyolefin derivatives (e.g., chlorinated polyethylene, polyvinylidene chloride, polyvinyl chloride, fluororesin), polyolefin wax, petroleum wax, and carnauba wax.

Examples of the copolymerized polyolefin include, but are not limited to, ethylene-vinyl monomer copolymers such as ethylene-propylene copolymer, ethylene-vinyl acetate copolymer (EVA), ethylene-methyl acrylate copolymer, ethylene-acrylic acid copolymer, ethylene-methacrylic acid copolymer, and ethylene-vinyl alcohol copolymer.

These resins constituting the resin particles may be used alone or in combination with others.

The resin particles may be surface-modified. In this case, dispersibility of the resin particles in a coating liquid used for manufacturing the porous insulator 10 can be improved. As a result, distribution of the resin particles in the porous insulator 10 becomes uniform and the shape maintaining function and the shutdown function of the porous insulator 10 are improved.

Surface modification of the resin particles may be conducted by, for example, introducing a polar group such as an alkoxy group, amide group, carboxyl group, and sulfonic acid group to the surface by utilizing a reactive group such as an ethylenic unsaturated group and epoxy group.

The particle diameter of the resin particles is preferably from 0.01 to 100 μm, and more preferably from 0.1 to 1 μm. When the particle diameter of the resin particles is 0.01 μm or more, the shutdown function of the porous insulator 10 is improved. When the particle diameter of the resin particles is 100 μm or less, communicability of the pores 31 of the porous insulator 10 is improved.

Method for Manufacturing Porous Insulator

The porous insulator 10 in which the polymer compound has no cross-linked structure may be manufactured by a method utilizing a phase separation phenomenon such as a thermally induced phase separation method and a poor solvent induced phase separation method.

In this case, the solvent to be used for the coating liquid for manufacturing the porous insulator 10 is not particularly limited and may be appropriately selected considering solubility parameter so as to form a desired porous structure.

As another example, the porous insulator 10 may be manufactured by a method including applying a coating liquid containing a polymerization initiator, a polymerizable compound, and the solid 12 (where the polymerizable compound is dissolved in the coating liquid) and irradiating it with non-ionizing radiation, ionizing radiation, or infrared rays.

The polymer compound having a cross-linked structure is poorly soluble in general. Therefore, the porous insulator 10 in which the polymer compound has a cross-linked structure is manufactured using a coating liquid containing one or more types of polyfunctional polymerizable compounds (e.g., a cross-linkable monomer, a cross-linkable oligomer).

The polyfunctional polymerizable compound refers to a compound having two or more polymerizable groups.

In this case, the porous insulator 10 can be formed by utilizing a polymerization induced phase separation method.

The polyfunctional polymerizable compound is not particularly limited as long as it can be cross-linked by irradiation with non-ionizing radiation, ionizing radiation, or infrared rays. Examples thereof include, but are not limited to, acrylate resin, methacrylate resin, urethane acrylate resin, vinyl ester resin, unsaturated polyester, epoxy resin, oxetane resin, vinyl ether, and a resin utilizing an ene-thiol reaction.

Of these, for productivity, acrylate resin, methacrylate resin, urethane acrylate resin, and vinyl ester resin are preferable.

Examples of radically polymerizable monomers as the polyfunctional polymerizable compound include, but are not limited to, an ester compound obtained by epoxidizing a double bond of a terpene having an unsaturated bond (such as myrcene, carene, ocimene, pinene, limonene, camphene, terpinolene, tricyclene, terpinene, fenchene, phellandrene, sylvestrene, sabinene, dipentene, bornene, isopulegol, and carvone) and adducting acrylic acid or methacrylic acid thereto, an ester compound of a terpene-derived alcohol (such as citronellol, pinocampheol, geraniol, fenchyl alcohol, nerol, borneol, linalool, menthol, terpineol, citronellal, ionone, citral, pinol, cyclocitral, carvomenthone, ascaridole, safranal, piperitol, menthene monool, dihydrocarvone, carveol, sclareol, hinokiol, ferruginol, totarol, sugiol, farnesol, patchouli alcohol, nerolidol, carotol, cadinol, lanceol, eudesmol, and phytol) with acrylic acid or methacrylic acid, hinokiic acid, santalic acid, and an acrylate or methacrylate compound having an ester side chain having the backbone of menthone, carvotanacetone, phellandral, perillaldehyde, thujone, calone, camphor, bisabolene, santalene, zingiberene, caryophyllene, curcumene, cedrene, cadinene, longifolene, sesquibenihene, cedrol, guaiol, kessoglycol, cyperone, eremophilone, zerumbone, camphorene, podocarprene, phyllocladene, ketomanoyl oxide, manoyl oxide, abietic acid, pimaric acid, neoabietic acid, levopimaric acid, iso-d-pimaric acid, agathene dicarboxylic acid, carotenoid, piperitone, ascaridole, fenchene, a sesquiterpene, a diterpene, or a triterpene.

As the polymerization initiator, a photopolymerization initiator or a thermal polymerization initiator may be used.

As the photopolymerization initiator, a photoradical generator may be used.

Examples of the photoradical generator include, but are not limited to, α-hydroxyacetophenone, α-aminoacetophenone, 4-aroyl-1,3-dioxolane, benzyl ketal, 2,2-diethoxyacetophenone, p-dimethylaminoacetophene, p-dimethylaminopropiophenone, benzophenone, 2-chlorobenzophenone, 4,4'-dichlorobenzophenone, 4,4'-bisdiethylaminobenzophenone, Michler's ketone, benzyl, benzoin, benzyl dimethyl ketal, tetramethylthiuram monosulfide, thioxanthone, 2-chlorothioxanthone, 2-methylthioxanthone, azobisisobutyronitrile, benzoin peroxide, di-tert-butyl peroxide, 1-hydroxycyclohexyl phenyl ketone, 2-hydroxy-2-methyl-1-phenyl-1-one, 1-(4-isopropylphenyl)-2-hydroxy-2-methylpropane-1-one, methyl benzoylformate, benzoin alkyl ethers and esters such as benzoin isopropyl ether, benzoin methyl ether, benzoin ethyl ether, benzoin isobutyl ether, benzoin n-butyl ether, and benzoin n-propyl ether, (1-hydroxycyclohexyl) phenyl ketone, 2-benzyl-2-dimethylamino-1-(4-morpholinophenyl)-butanone-1, (1-hydroxycyclohexylphenyl) ketone, 2,2-dimethoxy-1,2-diphenylethane-1-one, bis($\eta^5$-2,4-cyclopentadiene-1-yl)-bis(2,6-difluoro-3-(1H-pyrrole-1-yl)phenyl) titanium, bis(2,4,6-trimethylbenzoyl)phenylphosphine oxide, 2-methyl-1-[4-(methylthio)phenyl]-2-morpholinopropane-1-one, 2-hydroxy-2-methyl-1-phenylpropane-1-one (DAROCURE 1173), bis(2,6-dimethoxybenzoyl)-2,4,4-trimethylpentylphosphine oxide, 1-[4-(2-hydroxyethoxy)phenyl]-2-hydroxy-2-methyl-1-propane-1-one monoacylphosphine oxide, bisacylphosphine oxide, titanocene, fluorescein, anthraquinone, thioxanthone or xanthone, lophine dimer, trihalomethyl compounds or dihalomethyl compounds, active ester compounds, and organic boron compounds.

A photo-cross-linking radical generator such as a bisazide compound may be used in combination with the photoradical generator.

Examples of the thermal polymerization initiator include, but are not limited to, azobisisobutyronitrile (AIBN).

As the polymerization initiator, a photoacid generator may also be used. In this case, when the applied coating liquid is irradiated with light, the photoacid generator generates an acid and the polyfunctional polymerizable compound is cross-linked.

Examples of the polyfunctional polymerizable compound which is cross-linked in the presence of an acid include, but are not limited to, monomers having a cationically-polymerizable vinyl bond, such as compounds having a cyclic ether group such as epoxy group, oxetane group, and oxolane group, acrylic compounds or vinyl compounds having the above-described substituent on a side chain, carbonate compounds, low-molecular-weight melamine compounds, vinyl ethers and vinylcarbazoles, styrene derivatives, α-methylstyrene derivatives, and vinyl alcohol esters such as ester compounds of vinyl alcohols with acrylic acid or methacrylic acid.

Examples of the photoacid generator include, but are not limited to, onium salts, diazonium salts, quinone diazide compounds, organic halides, aromatic sulfonate compounds, bisulfone compounds, sulfonyl compounds, sulfonate compounds, sulfonium compounds, sulfamide compounds, iodonium compounds, and sulfonyl diazomethane compounds. Of these, onium salts are preferable.

Examples of the onium salts include, but are not limited to, diazonium salts, phosphonium salts, and sulfonium salts having a counter ion such as a fluoroborate anion, a hexafluoroantimonate anion, a hexafluoroarsenate anion, a trifluoromethanesulfonate anion, a p-toluenesulfonate anion, and a p-nitrotoluenesulfonate anion.

Examples of the photoacid generator further include halogenated triazine compounds.

Each of these photoacid generators may be used alone or in combination with others.

When the photoacid generator is used, a sensitizing dye may be used in combination.

Examples of the sensitizing dye include, but are not limited to, acridine compounds, benzoflavins, perylene, anthracene, and laser dyes.

The coating liquid used for manufacturing the porous insulator 10 preferably further contains a porogen. The porogen is used for forming the pores 31 in the porous insulator 10.

The porogen is not particularly limited as long as it is a liquid substance capable of dissolving the polymerizable compound and the polymerization initiator and phase-separating the resulting polymer as the polymerization of the polymerizable compound proceeds. Examples thereof include, but are not limited to, ethylene glycols such as diethylene glycol monomethyl ether, ethylene glycol monobutyl ether, and dipropylene glycol monomethyl ether, esters such as γ-butyrolactone and propylene carbonate, and amides such as N,N-dimethylacetamide.

Liquid substances having a relatively large molecular weight, such as methyl tetradecanoate, methyl decanoate, methyl myristate, and tetradecane, also tend to function as the porogen.

Among them, ethylene glycol is preferred since it has a high boiling point and improves production stability of the porous insulator 10.

Each of the above-described porogens may be used alone or in combination with others.

The viscosity of the coating liquid used for manufacturing the porous insulator 10 is preferably from 1 to 150 mPa·s, more preferably from 5 to 20 mPa·s, at 25 degrees C. In this case, the coating liquid penetrates into clearances in the active material 22, so that a part of the porous insulator 10 can be present in a part of the electrode mixture 23.

The proportion of the polymerizable compound in the coating liquid is preferably from 10% to 70% by mass, and more preferably from 10% to 50% by mass. When the proportion is 10% by mass or more, the strength of the porous insulator 10 is improved. When the proportion is 70% by mass or less, the coating liquid penetrates into clearances in the active material 22, so that a part of the porous insulator 10 can be present in a part of the electrode mixture 23.

The volume ratio between the polymerizable compound and the solid 12 contained in the coating liquid is not particularly limited as long as the coating liquid can be applied to the porous insulator 10 and can be appropriately selected according to the purpose. The volume ratio is preferably from 1:1 to 1:15, and more preferably from 1:1 to 1:10. In this case, the shutdown function of the porous insulator 10 is improved.

There is no particular limitation on the coating method of the coating liquid. Examples thereof include, but are not limited to, spin coating, casting, micro gravure coating, gravure coating, bar coating, roll coating, wire bar coating, dip coating, slit coating, capillary coating, spray coating, nozzle coating, and various printing methods such as gravure printing, screen printing, flexographic printing, offset printing, reverse printing, and inkjet printing.

The electrode mixture 23 for nonaqueous power storage elements may be formed by applying a coating liquid in which a powdery active material is dispersed in a dispersion medium onto the electrode substrate 21, followed by drying.

The coating method of the coating liquid may be, for example, a printing method using a spray, a dispenser, a die coater, or a pulling up coating.

The cathode active material for lithium ion secondary batteries is not particularly limited as long as it is capable of reversibly adsorbing and releasing alkali metal ions. Examples thereof include, but are not limited to, alkali-metal-containing transition metal compounds.

Each of these cathode active materials may be used alone or in combination with others.

Examples of lithium-containing transition metal compounds include, but are not limited to, a composite oxide comprising lithium and one or more elements selected from the group consisting of cobalt, manganese, nickel, chromium, iron, and vanadium.

Specific examples of the cathode active material include, but are not limited to, lithium-containing transition metal oxides such as lithium cobalt oxide, lithium nickel oxide, and lithium manganese oxide; olivine-type lithium salts such as $LiFePO_4$; chalcogen compounds such as titanium disulfide and molybdenum disulfide; and manganese dioxide.

The lithium-containing transition metal oxide refers to a metal oxide containing lithium and a transition metal, or a metal oxide in which a part of the transition metal therein is substituted with a different element.

Examples of the different element include, but are not limited to, Na, Mg, Sc, Y, Mn, Fe, Co, Ni, Cu, Zn, Al, Cr, Pb, Sb, and B. Of these, Mn, Al, Co, Ni, and Mg are preferable.

Each of these different elements may be used alone or in combination with others.

The anode active material for lithium ion secondary batteries is not particularly limited as long as it is capable of reversibly adsorbing and releasing alkali metal ions. Examples thereof include, but are not limited to, carbon materials containing graphite having a graphite-type crystal structure.

Examples of the carbon materials include, but are not limited to, natural graphite, spherical or fibrous synthetic graphite, poorly-graphitizable carbon (hard carbon), and easily-graphitizable carbon (soft carbon).

Examples of the anode active material other than the carbon materials include lithium titanate.

For energy density of lithium ion secondary batteries, high capacity materials such as silicon, tin, silicon alloy, tin alloy, silicon oxide, silicon nitride, and tin oxide can also be used as the anode active material.

Examples of the cathode active material for nickel hydrogen secondary batteries include, but are not limited to, nickel hydroxide.

Examples of the anode active material for nickel hydrogen secondary batteries include, but are not limited to, $AB_2$-type or $A_2B$-type hydrogen storage alloys such as a Zr—Ti—Mn—Fe—Ag—V—Al—W alloy and a $Ti_{15}Zr_{21}V_{15}Ni_{29}Cr_5Co_5Fe_1Mn_8$ alloy.

The electrode mixture 23 may further contain a binder and a conducting agent.

Examples of the binder include, but are not limited to, polyvinylidene fluoride (PVDF), polytetrafluoroethylene (PTFE), polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyether sulfone, hexafluoropolypropylene, styrene butadiene rubber, and carboxymethyl cellulose.

Examples of the binder further include copolymers of two or more monomers selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene.

Each of these binders may be used alone or in combination with others.

Examples of the conducting agent include, but are not limited to, graphites such as natural graphite and synthetic graphite; carbon blacks such as acetylene black, Ketjen black, channel black, furnace black, lamp black, and thermal black; conductive fibers such as carbon fibers and metal fibers; powders of metals such as carbon fluoride and aluminum; conductive whiskers such as zinc oxide and potassium titanate; conductive metal oxides such as titanium oxide; and conductive materials such as phenylene derivatives and graphene derivatives.

The electrode substrate 21 for nonaqueous power storage elements is not particularly limited as long as it is a substrate having planarity and conductivity. The electrode substrate 21 may be any of an aluminum foil, a copper foil, a stainless steel foil, and a titanium foil, which are used for secondary batteries and capacitors, an etched foil with fine holes formed by etching the above foil, and a perforated electrode substrate used for lithium ion capacitors.

The active material for fuel cells generally comprised of catalyst particles such as platinum particles, ruthenium particles, and platinum alloy particles, supported on the surface of a catalyst carrier such as carbon.

The electrode mixture 23 for fuel cells may be formed by applying a coating liquid containing a catalyst carrier carrying a precursor of catalyst particles onto the electrode substrate 21 and reducing the coating under hydrogen atmosphere.

The precursor of catalyst particles may be supported on the surface of the catalyst carrier by a process including: dissolving the precursor of catalyst particles in a suspension in which the catalyst carrier is suspended in water; and adding an alkali thereto to produce a metal hydroxide and make the metal hydroxide supported on the surface of the catalyst carrier at the same time.

Examples of the precursor of catalyst particles include, but are not limited to, chloroplatinic acid, dinitrodiamino platinum, platinum(IV) chloride, platinum(II) chloride, bisacetylacetonatoplatinum, dichlorodiammine platinum, dichlorotetramine platinum, platinum sulfate chlororuthenate, hexachloroiridate, hexachlororhodate, ferric chloride, cobalt chloride, chromium chloride, gold chloride, silver nitrate, rhodium nitrate, palladium chloride, nickel nitrate, iron sulfate, and copper chloride.

Examples of the electrode substrate 21 for fuel cells include, but are not limited to, a fibrous carbon paper electrode used for fuel cells put into an unwoven or woven planar form, and the above-described perforated electrode substrate having fine holes.

Examples of the active material for solar cells include, but are not limited to, oxide semiconductor powders such as $WO_3$ powder, $TiO_2$ powder, $SnO_2$ powder, ZnO powder, $ZrO_2$ powder, $Nb_2O_5$ powder, $CeO_2$ powder, $SiO_2$ powder, and $Al_2O_3$ powder.

The electrode mixture 23 for solar cells may be formed by applying a coating liquid containing an oxide semiconductor powder carrying a dye onto the electrode substrate 21.

Examples of the dye include, but are not limited to, ruthenium-tris transition metal complex, ruthenium-bis transition metal complex, osmium-tris transition metal complex, osmium-bis transition metal complex, ruthenium-cis-di-aqua-bipyridyl complex, phthalocyanine and porphyrin, and organic-inorganic perovskite crystals.

Examples of the electrode substrate 21 for solar cells include, but are not limited to, a substrate in which a transparent semiconductor film of indium-titanium oxide, zinc oxide, or the like, is formed on a flat substrate formed of glass, plastic, or the like, and a substrate on which a conductive electrode film is deposited, which are used for solar cells.

Nonaqueous Power Storage Element

The nonaqueous power storage element according to an embodiment of the present invention includes the electrode according to an embodiment of the present invention. At this time, the electrode is either a cathode or an anode.

In the nonaqueous power storage element of the present embodiment, the cathode and the anode are disposed with a separator therebetween. Preferably, the cathode and the anode are laminated in an alternating manner with a separator therebetween. At this time, the number of laminated layers of the cathode and the anode can be arbitrarily determined.

Since the electrode includes the porous insulator according to an embodiment of the present invention, the separator can be omitted, if necessary.

The nonaqueous power storage element of the present embodiment is preferably injected with a nonaqueous electrolytic solution and sealed with an exterior. To insulate from the exterior, it is preferable that a separator is disposed between the electrodes on both sides and the exterior.

The nonaqueous power storage element is not particularly limited and may be appropriately selected according to the purpose. Examples thereof include, but are not limited to, a nonaqueous secondary battery and a nonaqueous capacitor.

The shape of the nonaqueous power storage element is not particularly limited and may be appropriately selected from among known shapes according to the use thereof. For example, the shape of the nonaqueous power storage element may be of a laminate type, a cylinder type in which a sheet electrode and a separator are spirally assembled, another cylinder type in which a pellet electrode and a separator are combined into an inside-out structure, or a coin type in which a pellet electrode and a separator are laminated.

Figure 4:
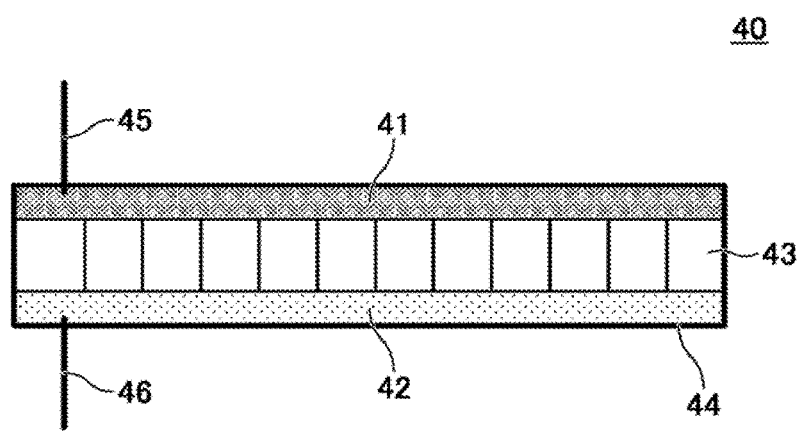
FIG. 4 is a schematic view of a nonaqueous power storage element according to an embodiment of the present invention.

FIG. 4 is a schematic view of the nonaqueous power storage element according to an embodiment of the present invention.

A nonaqueous power storage element 40 includes a cathode 41, an anode 42, a separator 43 holding a nonaqueous electrolytic solution, an exterior can 44, a lead wire 45 of the cathode 41, and a lead wire 46 of the anode 42.

Separator

The separator is provided between the anode and the cathode to prevent a short circuit between the anode and the cathode.

The separator has ion permeability and does not have electron conductivity.

The separator is not particularly limited and may be appropriately selected according to the purpose. Examples thereof include, but are not limited to, papers such as Kraft paper, vinylon mixed paper, and synthetic pulp mixed paper, cellophane, polyethylene grafted films, polyolefin unwoven fabrics such as polypropylene melt-flow unwoven fabric, polyamide unwoven fabrics, glass fiber unwoven fabrics, polyethylene microporous membranes, and polypropylene microporous membranes.

For holding the nonaqueous electrolytic solution, the separator preferably has a porosity of 50% or more.

The average thickness of the separator is preferably from 3 to 50 µm, and more preferably from 5 to 30 µm. When the average thickness of the separator is 3 µm or more, it is easy to prevent a short circuit between the anode and the cathode. When the average thickness is 50 µm or less, the electrical resistance between the anode and the cathode hardly increases.

The shape of the separator is not particularly limited as long as it can be applied to the nonaqueous power storage element, and can be appropriately selected according to the purpose. For example, the shape may be a sheet-like shape.

The size of the separator is not particularly limited as long as it can be applied to the nonaqueous power storage element, and can be appropriately selected according to the purpose.

The separator may have either a single-layer structure or a multi-layer structure.

Nonaqueous Electrolytic Solution

The nonaqueous electrolytic solution refers to an electrolytic solution in which an electrolyte salt is dissolved in a nonaqueous solvent.

Nonaqueous Solvent

The nonaqueous solvent is not particularly limited and may be appropriately selected depending on the purpose, but an aprotic organic solvent is preferable.

Examples of the aprotic organic solvent include, but are not limited to, a carbonate-based organic solvent such as chain carbonates and cyclic carbonates.

Examples of the chain carbonates include, but are not limited to, dimethyl carbonate (DMC), diethyl carbonate (DEC), methyl ethyl carbonate (EMC), and methyl propionate (MP).

Examples of the cyclic carbonates include, but are not limited to, propylene carbonate (PC), ethylene carbonate (EC), butylene carbonate (BC), and vinylene carbonate (VC).

Among these, ethylene carbonate (EC) and dimethyl carbonate (DMC) are preferably used in combination. At this time, the ratio between ethylene carbonate (EC) and dimethyl carbonate (DMC) is not particularly limited and can be appropriately selected according to the purpose.

In the present embodiment, a nonaqueous solvent other than the carbonate-based organic solvent may be used, if necessary.

Examples of the nonaqueous solvent other than the carbonate-based organic solvent include, but are not limited to, ester-based organic solvents such as cyclic esters and chain esters, and ether-based organic solvents such as cyclic ethers and chain ethers.

Specific examples of the cyclic esters include, but are not limited to, γ-butyrolactone (γ-BL), 2-methyl-γ-butyrolactone, acetyl-γ-butyrolactone, and γ-valerolactone.

Specific examples of the chain esters include, but are not limited to, propionic acid alkyl esters, malonic acid dialkyl esters, acetic acid alkyl esters (e.g., methyl acetate (MA), ethyl acetate), and formic acid alkyl esters (e.g., methyl formate (MF), ethyl formate).

Specific examples of the cyclic ethers include, but are not limited to, tetrahydrofuran, alkyltetrahydrofuran, alkoxytetrahydrofuran, dialkoxytetrahydrofuran, 1,3-dioxolan, alkyl-1,3-dioxolan, and 1,4-dioxolan.

Specific examples of the chain ethers include, but are not limited to, 1,2-dimethoxyethane (DME), diethyl ether, ethylene glycol dialkyl ethers, diethylene glycol dialkyl ethers, triethylene glycol dialkyl ethers, and tetraethylene glycol dialkyl ethers.

Electrolyte Salt

The electrolyte salt is not particularly limited as long as it has high ion conductivity and is soluble in a nonaqueous solvent. Preferred examples thereof include a lithium salt.

The lithium salt is not particularly limited and can be appropriately selected according to the purpose. Examples thereof include, but are not limited to, lithium hexafluorophosphate ($LiPF_6$), lithium perchlorate ($LiClO_4$), lithium chloride (LiCl), lithium tetrafluoroborate ($LiBF_4$), lithium hexafluoroarsenate ($LiAsF_6$), lithium trifluoromethasulfonate ($LiCF_3SO_3$), lithium bis(trifluoromethylsulfonyl) imide ($LiN(CF_3SO_2)_2$), and lithium bis(perfluoroethylsulfonyl)imide ($LiN(C_2F_5SO_2)_2$). Among these, $LiPF_6$ is particularly preferable in view of the occlusion amount of anions in the carbon electrode.

Each of these electrolyte salts may be used alone or in combination with others.

The content of the electrolyte salt in the nonaqueous electrolytic solution is not particularly limited and may be appropriately selected according to the purpose, but is preferably from 0.7 to 4 mol/L, more preferably from 1.0 to 3 mol/L, and most preferably from 1.0 to 2.5 mol/L.

Application of Nonaqueous Power Storage Element

The power storage element according to the present embodiment is not particularly limited in application and can be used for various purposes. For example, the power storage element may be used for laptop computers, pen input personal computers, mobile personal computers, electronic book players, cellular phones, portable facsimile machines, portable copiers, portable printers, headphone stereos, video movie recorders, liquid crystal display televisions, handy cleaners, portable CD players, mini disk players, transceivers, electronic organizers, calculators, memory cards, portable tape recorders, radios, backup power sources, motors, illumination apparatuses, toys, game machines, clocks, electronic flashes, and cameras.

EXAMPLES

Further understanding can be obtained by reference to certain specific examples which are provided herein for the purpose of illustration only and are not intended to be limiting.

Using devices A and B (illustrated in FIGS. 5 and 6, respectively) prepared by the methods described later, insulating properties upon heating, the porosity of the porous insulator, and a change in porosity of the porous insulator upon heating were evaluated.

Insulating Properties Upon Heating

Insulating properties upon heating were evaluated using the devices A and B. Specifically, a direct current resistance value between the anode substrates was measured when the devices A and B were heated to 200 degrees C. Insulating properties upon heating were evaluated according to the following criteria.

A: The direct current resistance value between the anode substrates is 1 MΩ or more.

B: The direct current resistance value between the anode substrates is 1 KΩ or more and less than 1 MΩ.

C: The direct current resistance value between the anode substrates is less than 1 KΩ.

Porosity of Porous Insulator

The porosity of the porous insulator was evaluated using the device A at room temperature (25 degrees C.). Specifically, first, the device A was filled with a unsaturated fatty acid (commercially available butter) and then osmium dyeing was conducted. Next, a cross-sectional structure of the porous insulator inside the device A was cut out with a focused ion beam (FIB) and observed with a scanning electron microscope (SEM) to measure the porosity of the porous insulator. The porosity of the porous insulator was evaluated according to the following criteria.

A+: The porosity is 50% or more.

A: The porosity is 30% or more and less than 50%.

C: The porosity is less than 30%.

Change in Porosity of Porous Insulator Upon Heating

A change in porosity of the porous insulator upon heating was evaluated using the device A. Specifically, first, the device A was heated at 200 degrees C. for 15 minutes using a hot plate. Subsequently, the device A was filled with a unsaturated fatty acid (commercially available butter) and then osmium dyeing was conducted. Next, a cross-sectional structure of the porous insulator inside the device A was cut out with a focused ion beam (FIB) and observed with a scanning electron microscope (SEM) to measure the porosity of the porous insulator upon heating, and the difference from the porosity of the porous insulator measured at room temperature was determined. The change in porosity of the porous insulator upon heating was evaluated according to the following criteria.

A+: A decrease in porosity is 30% or more.

A: A decrease in porosity is 5% or more and less than 30%.

B: A decrease in porosity is 1% or more and less than 5%.

C: A decrease in porosity is less than 1%.

Example 1

Figure 5:
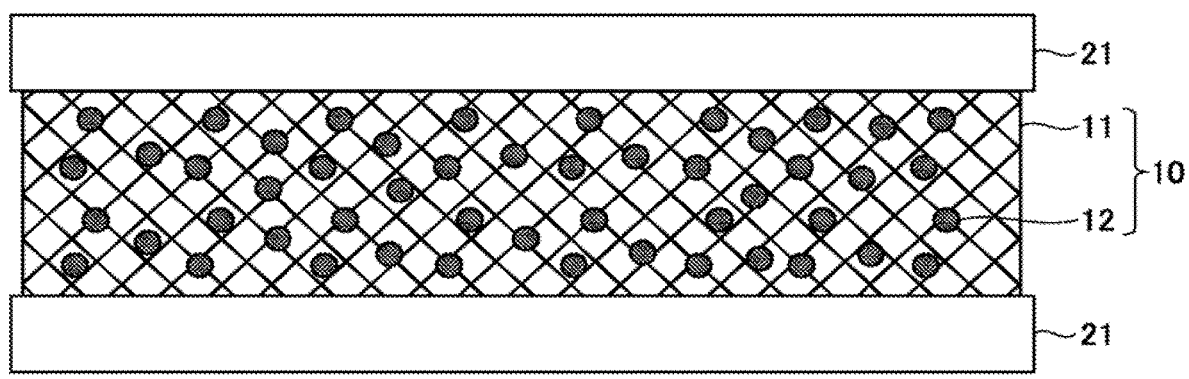
FIG. 5 is a schematic cross-sectional view of a device A prepared in Examples.

The device A illustrated in FIG. 5 was prepared by the processes (1) to (3) described below.

(1) Preparation of Porous Insulator Ink

A porous insulator ink was prepared by mixing 14 parts by mass of tricyclodecane dimethanol diacrylate (manufactured by DAICEL-ALLNEX LTD.) as a cross-linkable monomer, 32 parts by mass of dipropylene glycol monomethyl ether (manufactured by Kanto Chemical Co., Inc.) as a porogen, 0.7 parts by mass of IRGACURE 184 (manufactured by BASF SE) as a photopolymerization initiator, and 54 parts by mass of polypropylene (PP) wax particles (manufactured by Mitsui Chemicals, Inc.) having a melting point of 140 degrees C. as resin particles.

Here, the volume ratio between the cross-linkable monomer and the resin particles contained in the porous insulator ink was 1:4.

(2) Formation of Porous Insulator

The porous insulator ink was applied onto a copper foil having a thickness of 8 μm as an anode substrate with a dispenser and irradiated with ultraviolet under $N_2$ atmosphere so that the cross-linkable monomer got cross-linked. Next, the solvent was removed by application of heat at 100 degrees C. for 1 minute using a hot plate to form a porous insulator.

As a result of observing the surface of the porous insulator with SEM, it was found that macropores having a pore diameter of about 0.1 to 10 μm were formed.

(3) Preparation of Device A

The device A was prepared by laminating a copper foil having a thickness of 8 μm as an anode substrate on the anode substrate on which the porous insulator had been formed.

Next, insulating properties upon heating, the porosity of the porous insulator, and a change in porosity of the porous insulator upon heating were evaluated using the device A (see Table 2).

The direct current resistance value between the anode substrates of the device A measured at room temperature was 20 MΩ or more, which indicates high insulating properties.

Figure 6:
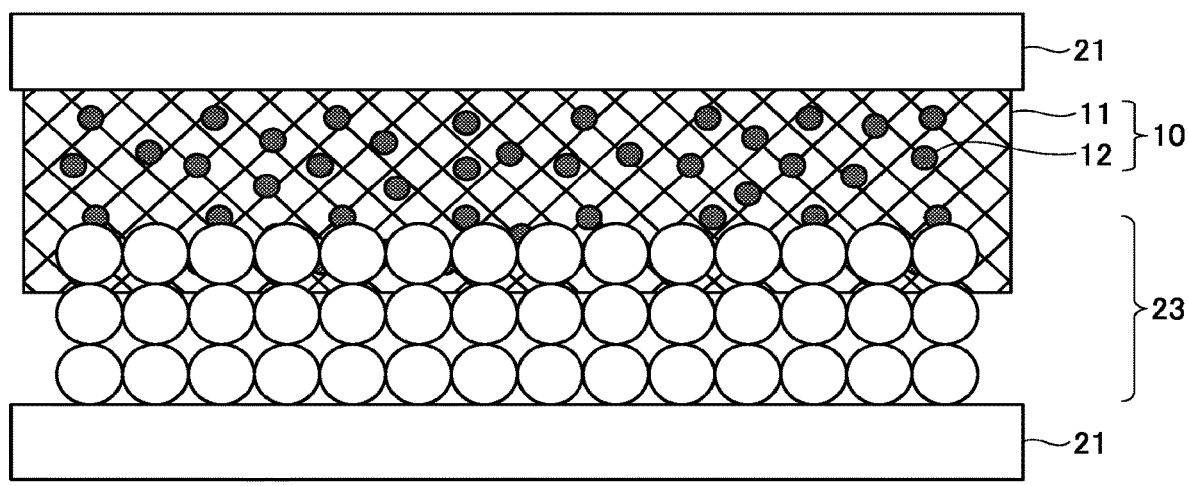
FIG. 6 is a schematic cross-sectional view of a device B prepared in Examples.

The device B illustrated in FIG. 6 was prepared by the processes (4) to (6) described below.

(4) Formation of Anode Mixture

An anode mixture ink was prepared by uniformly dispersing in water 97 parts by mass of graphite particles having an average particle size of 10 μm as an anode active material, 1 part by mass of cellulose as a thickener, and 2 parts by mass of an acrylic resin as a binder.

The anode mixture ink was applied onto a copper foil having a thickness of 8 μm as an anode substrate with a dispenser, dried at 120 degrees C. for 10 minutes, and pressed to form an anode mixture having a thickness of 60 μm.

The electrode substrate on which the anode mixture had been formed was cut into a piece having sides of 50 mm×33 mm.

(5) Formation of Porous Insulator

The porous insulator ink was applied onto the electrode substrate on which the anode mixture had been formed with a dispenser and irradiated with ultraviolet under $N_2$ atmosphere so that the cross-linkable monomer got cross-linked. Next, the solvent was removed by application of heat at 100 degrees C. for 1 minute using a hot plate to form a porous insulator.

As a result of observing the surface of the porous insulator with SEM, it was found that macropores having a pore diameter of about 0.1 to 10 μm were formed.

(6) Preparation of Device B

The device B was prepared by laminating a copper foil having a thickness of 8 μm as an anode substrate on the electrode substrate on which the porous insulator had been formed.

Next, insulating properties upon heating were evaluated using the device B (see Table 2).

Example 2

(1) Preparation of Porous Insulator Ink

A porous insulator ink was prepared by mixing 14 parts by mass of tricyclodecane dimethanol diacrylate (manufactured by DAICEL-ALLNEX LTD.) as a cross-linkable monomer, 32 parts by mass of dipropylene glycol monomethyl ether (manufactured by Kanto Chemical Co., Inc.) as a porogen, 0.7 parts by mass of IRGACURE 184 (manufactured by BASF SE) as a photopolymerization initiator, and 54 parts by mass of polyethylene (PE) wax particles (manufactured by Mitsui Chemicals, Inc.) having a melting point of 110 degrees C. as resin particles.

Here, the volume ratio between the cross-linkable monomer and the resin particles contained in the porous insulator ink was 1:4.

The processes (2) to (7) were conducted in the same manner as in Example 1 to prepare the devices A and B except that the porous insulator ink was replaced with that prepared above. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 μm were formed.

The direct current resistance value between the anode substrates of the device A measured at room temperature was 20 MΩ or more, which indicates high insulating properties.

Example 3

(1) Preparation of Porous Insulator Ink

A porous insulator ink was prepared by mixing 9 parts by mass of tricyclodecane dimethanol diacrylate (manufactured by DAICEL-ALLNEX LTD.) as a cross-linkable monomer, 20 parts by mass of dipropylene glycol monomethyl ether (manufactured by Kanto Chemical Co., Inc.) as a porogen, 0.4 parts by mass of IRGACURE 184 (manufactured by BASF SE) as a photopolymerization initiator, and 70 parts by mass of polyvinylidene fluoride (PVDF) particles TORAYPEARL (manufactured by Toray Industries, Inc.) having a melting point of 151 degrees C. as resin particles.

Here, the volume ratio between the cross-linkable monomer and the resin particles contained in the porous insulator ink was 1:4.

The processes (2) to (7) were conducted in the same manner as in Example 1 to prepare the devices A and B except that the porous insulator ink was replaced with that prepared above. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 μm were formed.

The direct current resistance value between the anode substrates of the device A measured at room temperature was 20 MΩ or more, which indicates high insulating properties.

Example 4

(1) Preparation of Porous Insulator Ink

A porous insulator ink was prepared by mixing 23 parts by mass of tricyclodecane dimethanol diacrylate (manufactured by DAICEL-ALLNEX LTD.) as a cross-linkable monomer, 53 parts by mass of dipropylene glycol monomethyl ether (manufactured by Kanto Chemical Co., Inc.) as a porogen, 1.1 parts by mass of IRGACURE 184 (manufactured by BASF SE) as a photopolymerization initiator, and 23 parts by mass of polypropylene wax particles (manufactured by Mitsui Chemicals, Inc.) having a melting point of 140 degrees C. as resin particles.

Here, the volume ratio between the cross-linkable monomer and the resin particles contained in the porous insulator ink was 1:1.

The processes (2) to (7) were conducted in the same manner as in Example 1 to prepare the devices A and B except that the porous insulator ink was replaced with that prepared above. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 μm were formed.

The direct current resistance value between the anode substrates of the device A measured at room temperature was 20 MΩ or more, which indicates high insulating properties.

Example 5

A porous insulator ink was prepared by mixing 23 parts by mass of tricyclodecane dimethanol diacrylate (manufactured by DAICEL-ALLNEX LTD.) as a cross-linkable monomer, 53 parts by mass of dipropylene glycol monomethyl ether (manufactured by Kanto Chemical Co., Inc.) as a porogen, 1.1 parts by mass of IRGACURE 184 (manufactured by BASF SE) as a photopolymerization initiator, and 23 parts by mass of polyethylene wax particles (manufactured by Mitsui Chemicals, Inc.) having a melting point of 110 degrees C. as resin particles.

Here, the volume ratio between the cross-linkable monomer and the resin particles contained in the porous insulator ink was 1:1.

The processes (2) to (7) were conducted in the same manner as in Example 1 to prepare the devices A and B except that the porous insulator ink was replaced with that prepared above. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 μm were formed.

The direct current resistance value between the anode substrates of the device A measured at room temperature was 20 MΩ or more, which indicates high insulating properties.

Example 6

A porous insulator ink was prepared by mixing 19 parts by mass of tricyclodecane dimethanol diacrylate (manufactured by DAICEL-ALLNEX LTD.) as a cross-linkable monomer, 43 parts by mass of dipropylene glycol monomethyl ether (manufactured by Kanto Chemical Co., Inc.) as a porogen, 0.9 parts by mass of IRGACURE 184 (manufactured by BASF SE) as a photopolymerization initiator, and 37 parts by mass of polyvinylidene fluoride particles TORAY-PEARL (manufactured by Toray Industries, Inc.) having a melting point of 151 degrees C. as resin particles.

Here, the volume ratio between the cross-linkable monomer and the resin particles contained in the porous insulator ink was 1:1.

The processes (2) to (7) were conducted in the same manner as in Example 1 to prepare the devices A and B except that the porous insulator ink was replaced with that prepared above. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 μm were formed.

The direct current resistance value between the anode substrates of the device A measured at room temperature was 20 MΩ or more, which indicates high insulating properties.

Example 7

The procedure in Example 1 was repeated to prepare the devices A and B except that the photopolymerization initiator was replaced with a thermal polymerization initiator AIBN (manufactured by Wako Pure Chemical Industries, Ltd.) and the ultraviolet irradiation in forming the porous insulator was replaced with heating at 70 degrees C., and insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 μm were formed.

The direct current resistance value between the anode substrates of the device A measured at room temperature was 20 MΩ or more, which indicates high insulating properties.

Example 8

The procedure in Example 2 was repeated to prepare the devices A and B except that the photopolymerization initiator was replaced with a thermal polymerization initiator AIBN (manufactured by Wako Pure Chemical Industries, Ltd.) and the ultraviolet irradiation in forming the porous insulator was replaced with heating at 70 degrees C., and insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 μm were formed.

The direct current resistance value between the anode substrates of the device A measured at room temperature was 20 MΩ or more, which indicates high insulating properties.

Example 9

The procedure in Example 3 was repeated to prepare the devices A and B except that the photopolymerization initiator was replaced with a thermal polymerization initiator AIBN (manufactured by Wako Pure Chemical Industries, Ltd.) and the ultraviolet irradiation in forming the porous insulator was replaced with heating at 70 degrees C., and insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 μm were formed.

The direct current resistance value between the anode substrates of the device A measured at room temperature was 20 MΩ or more, which indicates high insulating properties.

Example 10

A porous insulator ink was prepared by mixing 26 parts by mass of tricyclodecane dimethanol diacrylate (manufactured by DAICEL-ALLNEX LTD.) as a cross-linkable monomer, 60 parts by mass of dipropylene glycol monomethyl ether (manufactured by Kanto Chemical Co., Inc.) as a porogen, 1.0 part by mass of IRGACURE 184 (manufactured by BASF SE) as a photopolymerization initiator, and 13 parts by mass of polypropylene wax particles (manufactured by Mitsui Chemicals, Inc.) having a melting point of 140 degrees C. as resin particles.

Here, the volume ratio between the cross-linkable monomer and the resin particles contained in the porous insulator ink was 2:1.

The processes (2) to (7) were conducted in the same manner as in Example 1 to prepare the devices A and B except that the porous insulator ink was replaced with that prepared above. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 μm were formed.

The direct current resistance value between the anode substrates of the device A measured at room temperature was 20 MΩ or more, which indicates high insulating properties.

Example 11

A porous insulator ink was prepared by mixing 26 parts by mass of tricyclodecane dimethanol diacrylate (manufactured by DAICEL-ALLNEX LTD.) as a cross-linkable monomer, 60 parts by mass of dipropylene glycol monomethyl ether (manufactured by Kanto Chemical Co., Inc.) as a porogen, 1.0 part by mass of IRGACURE 184 (manufactured by BASF SE) as a photopolymerization initiator, and 13 parts by mass of polyethylene wax particles (manufactured by Mitsui Chemicals, Inc.) having a melting point of 110 degrees C. as resin particles.

Here, the volume ratio between the cross-linkable monomer and the resin particles contained in the porous insulator ink was 2:1.

The processes (2) to (7) were conducted in the same manner as in Example 1 to prepare the devices A and B except that the porous insulator ink was replaced with that prepared above. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 μm were formed.

The direct current resistance value between the anode substrates of the device A measured at room temperature was 20 MΩ or more, which indicates high insulating properties.

Example 12

A porous insulator ink was prepared by mixing 23 parts by mass of tricyclodecane dimethanol diacrylate (manufactured by DAICEL-ALLNEX LTD.) as a cross-linkable monomer, 53 parts by mass of dipropylene glycol monomethyl ether (manufactured by Kanto Chemical Co., Inc.) as a porogen, 1.0 part by mass of IRGACURE 184 (manufactured by BASF SE) as a photopolymerization initiator, and 23 parts by mass of polyvinylidene fluoride particles TORAY-PEARL (manufactured by Toray Industries, Inc.) having a melting point of 151 degrees C. as resin particles.

Here, the volume ratio between the cross-linkable monomer and the resin particles contained in the porous insulator ink was 2:1.

The processes (2) to (7) were conducted in the same manner as in Example 1 to prepare the devices A and B except that the porous insulator ink was replaced with that prepared above. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 μm were formed.

The direct current resistance value between the anode substrates of the device A measured at room temperature was 20 MΩ or more, which indicates high insulating properties.

Example 13

A porous insulator ink was prepared by mixing 6 parts by mass of tricyclodecane dimethanol diacrylate (manufactured by DAICEL-ALLNEX LTD.) as a cross-linkable monomer, 13 parts by mass of dipropylene glycol monomethyl ether (manufactured by Kanto Chemical Co., Inc.) as a porogen, 0.3 parts by mass of IRGACURE 184 (manufactured by BASF SE) as a photopolymerization initiator, and 81 parts by mass of polypropylene wax particles (manufactured by Mitsui Chemicals, Inc.) having a melting point of 140 degrees C. as resin particles.

Here, the volume ratio between the cross-linkable monomer and the resin particles contained in the porous insulator ink was 1:14.

The processes (2) to (7) were conducted in the same manner as in Example 1 to prepare the devices A and B except that the porous insulator ink was replaced with that prepared above. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 μm were formed.

The direct current resistance value between the anode substrates of the device A measured at room temperature was 20 MΩ or more, which indicates high insulating properties.

Example 14

A porous insulator ink was prepared by mixing 6 parts by mass of tricyclodecane dimethanol diacrylate (manufactured by DAICEL-ALLNEX LTD.) as a cross-linkable monomer, 13 parts by mass of dipropylene glycol monomethyl ether (manufactured by Kanto Chemical Co., Inc.) as a porogen, 0.3 parts by mass of IRGACURE 184 (manufactured by BASF SE) as a photopolymerization initiator, and 81 parts by mass of polyethylene wax particles (manufactured by Mitsui Chemicals, Inc.) having a melting point of 110 degrees C. as resin particles.

Here, the volume ratio between the cross-linkable monomer and the resin particles contained in the porous insulator ink was 1:14.

The processes (2) to (7) were conducted in the same manner as in Example 1 to prepare the devices A and B except that the porous insulator ink was replaced with that prepared above. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 μm were formed.

The direct current resistance value between the anode substrates of the device A measured at room temperature was 20 MΩ or more, which indicates high insulating properties.

Example 15

A porous insulator ink was prepared by mixing 3 parts by mass of tricyclodecane dimethanol diacrylate (manufactured by DAICEL-ALLNEX LTD.) as a cross-linkable monomer, 7 parts by mass of dipropylene glycol monomethyl ether (manufactured by Kanto Chemical Co., Inc.) as a porogen, 0.2 parts by mass of IRGACURE 184 (manufactured by BASF SE) as a photopolymerization initiator, and 89 parts by mass of polyvinylidene fluoride particles TORAY-PEARL (manufactured by Toray Industries, Inc.) having a melting point of 151 degrees C. as resin particles.

Here, the volume ratio between the cross-linkable monomer and the resin particles contained in the porous insulator ink was 1:14.

The processes (2) to (7) were conducted in the same manner as in Example 1 to prepare the devices A and B except that the porous insulator ink was replaced with that prepared above. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 µm were formed.

The direct current resistance value between the anode substrates of the device A measured at room temperature was 20 MΩ or more, which indicates high insulating properties.

Comparative Example 1

(1) Preparation of Porous Insulator Ink

A porous insulator ink was prepared by mixing 20 parts by mass of polypropylene wax particles (manufactured by Mitsui Chemicals, Inc.) having a melting point of 140 degrees C. as resin particles, 1 part by mass of polyvinylidene fluoride W #9100 (manufactured by KUREHA CORPORATION) as a binder, and 79 parts by mass of cyclohexanone (manufactured by Kanto Chemical Co., Inc.) as a solvent.

The procedure in Example 1 was repeated to prepare the devices A and B except that the porous insulator ink was replaced with that prepared above and the ultraviolet irradiation under $N_2$ atmosphere was omitted. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 µm were formed.

The direct current resistance value between the anode substrates of the device A measured at room temperature was 20 MΩ or more, which indicates high insulating properties.

Comparative Example 2

The procedure in Comparative Example 1 was repeated to prepare the devices A and B except that, in preparing the porous insulator ink, the polypropylene wax particles were replaced with polyethylene wax particles (manufactured by Mitsui Chemicals, Inc.) having a melting point of 110 degrees C. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 µm were formed.

Comparative Example 3

The procedure in Comparative Example 1 was repeated to prepare the devices A and B except that, in preparing the porous insulator ink, the polypropylene wax particles were replaced with polyvinylidene fluoride particles TORAY-PEARL (manufactured by Toray Industries, Inc.) having a melting point of 151 degrees C. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 µm were formed.

Comparative Example 4

The procedure in Comparative Example 1 was repeated to prepare the devices A and B except that, in preparing the porous insulator ink, the polypropylene wax particles were replaced with silica particles (manufactured by JGC Catalysts and Chemicals Ltd.) having high thermal resistance. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 µm were formed.

Comparative Example 5

The procedure in Example 1 was repeated to prepare the devices A and B except that, in preparing the porous insulator ink, the polypropylene wax particles were not added. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 µm were formed.

The direct current resistance value between the anode substrates of the device A measured at room temperature was 20 MΩ or more, which indicates high insulating properties.

Comparative Example 6

The procedure in Example 1 was repeated to prepare the devices A and B except that, in preparing the porous insulator ink, the polypropylene wax particles were replaced with silica particles (manufactured by JGC Catalysts and Chemicals Ltd.) having high thermal resistance. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that macropores having a pore diameter of about 0.1 to 10 µm were formed.

The direct current resistance value between the anode substrates of the device A measured at room temperature was 20 MΩ or more, which indicates high insulating properties.

Comparative Example 7

The procedure in Example 1 was repeated to prepare the devices A and B except that, in preparing the porous insulator ink, the porogen was replaced with cyclohexanone having high solubility in the polymer of the cross-linkable monomer. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that no macropores having a pore diameter of about 0.1 to 10 μm were formed.

The direct current resistance value between the anode substrates of the device A measured at room temperature was 20 MΩ or more, which indicates high insulating properties.

Comparative Example 8

The procedure in Comparative Example 5 was repeated to prepare the devices A and B except that, in preparing the porous insulator ink, the porogen was replaced with cyclohexanone having high solubility in the cross-linkable monomer. Next, insulating properties upon heating, the porosity of the porous insulator, and a change in porosity of the porous insulator upon heating were evaluated (see Table 2).

As a result of observing the surface of the porous insulator of each of the devices A and B with SEM, it was found that no macropores having a pore diameter of about 0.1 to 10 μm were formed.

The direct current resistance value between the anode substrates of the device A measured at room temperature was 20 MΩ or more, which indicates high insulating properties.

The compositions of the porous insulator inks are shown in Table 1.

TABLE 1

| | | Resin Particles | | | | |
|---|---|---|---|---|---|---|
| | Cross-linkable Monomer | Resin | Melting Point [degrees C] | Volume Ratio | Porogen | Polymerization Initiator |
| Example 1 | Tricyclodecane dimethanol diacrylate | PP wax | 140 | 1:4 | Dipropylene glycol monomethyl ether | Photo |
| Example 2 | Tricyclodecane dimethanol diacrylate | PE wax | 110 | 1:4 | Dipropylene glycol monomethyl ether | Photo |
| Example 3 | Tricyclodecane dimethanol diacrylate | PVDF | 151 | 1:4 | Dipropylene glycol monomethyl ether | Photo |
| Example 4 | Tricyclodecane dimethanol diacrylate | PP wax | 140 | 1:1 | Dipropylene glycol monomethyl ether | Photo |
| Example 5 | Tricyclodecane dimethanol diacrylate | PE wax | 110 | 1:1 | Dipropylene glycol monomethyl ether | Photo |
| Example 6 | Tricyclodecane dimethanol diacrylate | PVDF | 151 | 1:1 | Dipropylene glycol monomethyl ether | Photo |
| Example 7 | Tricyclodecane dimethanol diacrylate | PP wax | 140 | 1:4 | Dipropylene glycol monomethyl ether | Thermal |
| Example 8 | Tricyclodecane dimethanol diacrylate | PE wax | 110 | 1:4 | Dipropylene glycol monomethyl ether | Thermal |
| Example 9 | Tricyclodecane dimethanol diacrylate | PVDF | 151 | 1:4 | Dipropylene glycol monomethyl ether | Thermal |
| Example 10 | Tricyclodecane dimethanol diacrylate | PP wax | 140 | 2:1 | Dipropylene glycol monomethyl ether | Photo |
| Example 11 | Tricyclodecane dimethanol diacrylate | PE wax | 110 | 2:1 | Dipropylene glycol monomethyl ether | Photo |
| Example 12 | Tricyclodecane dimethanol diacrylate | PVDF | 151 | 2:1 | Dipropylene glycol monomethyl ether | Photo |
| Example 13 | Tricyclodecane dimethanol diacrylate | PP wax | 140 | 1:14 | Dipropylene glycol monomethyl ether | Photo |
| Example 14 | Tricyclodecane dimethanol diacrylate | PE wax | 110 | 1:14 | Dipropylene glycol monomethyl ether | Photo |
| Example 15 | Tricyclodecane dimethanol diacrylate | PVDF | 151 | 1:14 | Dipropylene glycol monomethyl ether | Photo |
| Comparative Example 1 | — | PP wax | 140 | — | — | — |
| Comparative Example 2 | — | PE wax | 110 | — | — | — |
| Comparative Example 3 | — | PVDF | 151 | — | — | — |
| Comparative Example 4 | — | — | — | — | — | — |

TABLE 1-continued

| | Cross-linkable Monomer | Resin | Resin Particles Melting Point [degrees C] | Volume Ratio | Porogen | Polymerization Initiator |
|---|---|---|---|---|---|---|
| Comparative Example 5 | Tricyclodecane dimethanol diacrylate | — | — | — | Dipropylene glycol monomethyl ether | Photo |
| Comparative Example 6 | Tricyclodecane dimethanol diacrylate | — | — | — | Dipropylene glycol monomethyl ether | Photo |
| Comparative Example 7 | Tricyclodecane dimethanol diacrylate | PP wax | 140 | 1:4 | — | Photo |
| Comparative Example 8 | Tricyclodecane dimethanol diacrylate | — | — | — | — | Photo |

Here, the volume ratio refers to the volume ratio between the cross-linkable monomer and the resin particles contained in the porous insulator ink.

Comparative Example 9

The device A illustrated in FIG. 5 was prepared by the process (1) described below.
(1) Preparation of Device A
The device A was prepared by laminating a polyolefin porous film UPORE (manufactured by Ube Industries, Ltd.) having macropores having a pore diameter of about 0.1 to 10 μm and further a copper foil having a thickness of 8 μm on a copper foil having a thickness of 8 μm as an anode substrate, and insulating properties upon heating was evaluated (see Table 2).
The direct current resistance value between the anode substrates of the device A measured at room temperature was 20 MΩ or more, which indicates high insulating properties.
The device B illustrated in FIG. 6 was prepared by the process (2) described below.
(2) Preparation of Device B
The procedure in Example 1 was repeated to prepare the device B except that a polyolefin porous film UPORE (manufactured by Ube Industries, Ltd.) having macropores having a pore diameter of about 0.1 to 10 μm and further a copper foil having a thickness of 8 μm were laminated on the electrode substrate on which an anode mixture had been formed, and insulating properties upon heating was evaluated (see Table 2).
Next, insulating properties upon heating, the porosity of the porous insulator, and a change in porosity of the porous insulator upon heating were evaluated using the devices A and B (see Table 2).
Evaluation results for insulating properties upon heating, the porosity of the porous insulator, and a change in porosity of the porous insulator upon heating are shown in Table 2.

TABLE 2

| | Insulating Properties upon Heating | | Porosity of Porous Insulator | |
|---|---|---|---|---|
| | Device A | Device B | Room Temperature | Change upon Heating |
| Example 1 | A | A | A+ | A+ |
| Example 2 | A | A | A+ | A+ |
| Example 3 | A | A | A+ | A+ |
| Example 4 | A | A | A+ | A |
| Example 5 | A | A | A+ | A |
| Example 6 | A | A | A+ | A |
| Example 7 | A | A | A+ | A+ |
| Example 8 | A | A | A+ | A+ |
| Example 9 | A | A | A+ | A+ |
| Example 10 | A | A | A | B |
| Example 11 | A | A | A | B |
| Example 12 | A | A | A | B |
| Example 13 | B | B | A | A |
| Example 14 | B | B | A | A |
| Example 15 | B | B | A | A |
| Comparative Example 1 | C | C | A | A |
| Comparative Example 2 | C | C | A | A |
| Comparative Example 3 | C | C | A | A |
| Comparative Example 4 | A | A | A | C |
| Comparative Example 5 | A | A | A | C |
| Comparative Example 6 | A | A | A | C |
| Comparative Example 7 | A | A | C | C |
| Comparative Example 8 | A | A | C | C |
| Comparative Example 9 | C | C | A | A |

It is clear from Table 2 that the porous insulators of Examples 1 to 15 have a high porosity. In addition, it is clear that the porous insulators of Examples 1 to 15 have a high shape maintaining function and a high shutdown function, because the insulating properties upon heating and the change in porosity upon heating are large. This is because the porous structure is formed of the polymer compound with a cross-linked structure having high heat resistance by using a porous insulator ink containing appropriate cross-linkable monomer, porogen, and resin particles, and the porous insulator thereby maintains insulting properties. Further, since the porous insulator contains resin particles having a melting point lower than that of the polymer compound, the resin particles melt before the shape of the polymer compound changes upon heating and block the pores of the porous structure, improving the shutdown function.

The porous insulator of Example 1 contains a larger amount of resin particles than the porous insulator of Example 4, and therefore the change in porosity of the porous insulator upon heating is larger and the shutdown function is higher.

The porous insulators of Examples 2, 3, 5, and 6 contain resin particles having different melting points from those of the porous insulator of Example 1 and deliver the same effect as the porous insulator of Example 1, since these resin particles have a lower melting point than the polymer compound.

In the porous insulators of Examples 7 to 9, the cross-linkable monomer is cross-linked by using a thermal polymerization initiator, and the same effects as those of the porous insulators of Examples 1 to 6 are delivered. This indicates that a porous insulator having a high shape maintaining function, a high shutdown function, and a high porosity can be formed by using a porous insulator ink containing appropriate cross-linkable monomer, porogen, and resin particles.

The porous insulators of Examples 10 to 12 contain a small amount of resin particles. Therefore, the change in porosity upon heating is smaller than that of the porous insulators of Examples 1 to 9.

The porous insulators of Examples 13 to 15 contain a large amount of resin particles. Therefore, the porosity thereof is lower than that of the porous insulators of Examples 1 to 9.

The porous insulators of Comparative Examples 1 to 3 have a shutdown function because of comprising resin particles and a binder, but the porosity is low. This is because the resin particles form a structure close to the closest packing. Further, when the porous insulators of Comparative Examples 1 to 3 reach a certain temperature, the resin particles constituting the porous structure turn into a liquid and the shape thereof rapidly changes, resulting in a low shape maintaining function.

The porous insulator of Comparative Example 4 has a high shape maintaining function because of containing silica particles having high heat resistance. However, the porosity thereof is low because of having the same structure as the porous insulators of Comparative Examples 1 to 3. Since silica particles do not melt even when they reach 200 degrees C., the change in porosity upon heating is small and the shutdown function is low in the porous insulator of Comparative Example 4.

The porous insulators of Comparative Examples 5 and 6 have a certain degree of porosity. However, the change in porosity upon heating is small and the shutdown function is low because they contain no resin particle.

The porous insulators of Comparative Examples 7 and 8 have high insulating properties upon heating but the porosity is low. This is because the cross-linkable monomer has high solubility in a solvent, so that phase separation hardly proceeds even when the polymerization of the cross-linkable monomer proceeds.

The porous insulator of Comparative Example 9 has a high porosity and a shutdown function, but has low insulating properties upon heating. This is because heat shrinkage occurs due to the strain generated during production of the porous insulator.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A porous insulator comprising:
   a porous monolithic structure having communicating pores, wherein the porous monolithic structure comprises a polymer compound and has a bicontinuous monolithic structure,
   wherein the porous monolithic structure is formed by polymerizing a polyfunctional polymerizable compound in a mixture with solid particles and a porogen by a polymerization induced phase separation method to form a mixture of the polymer compound, the solid particles and the porogen, then removing the porogen; and
   wherein the solid particles have a melting point or glass transition temperature lower than that of the polymer compound.

2. The porous insulator of claim 1, wherein the solid particles are resin particles.

3. The porous insulator of claim 1, wherein the polymer compound has a cross-linked structure.

4. The porous insulator of claim 1, wherein the porous monolithic structure does not contain a filler or a fibrous material.

5. The porous insulator of claim 4, wherein the porous monolithic structure does not contain any of a filler having a melting point or a glass transition temperature greater than that of the polymer compound and a fibrous material having a melting point or a glass transition temperature greater than that of the polymer compound.

6. The porous insulator of claim 1, wherein the volume ratio of the polymer compound to the solid particles is 1:4 or greater.

7. The porous insulator of claim 1, wherein the bicontinuous monolithic structure has a backbone comprising a three-dimensional branched network structure of the polymer compound.

8. The porous insulator of claim 1, which is in the form of a thin film having a thickness of from 3 μm to 50 μm.

9. The porous insulator of claim 1, wherein the solid particles are resin particles having a melting point in the range of from 80 to 130° C.

10. The porous insulator of claim 1, wherein the porous monolithic structure includes pores having a diameter of from 0.1 μm to 10 μm.

11. The porous insulator of claim 1, wherein the solid particles are in the form of resin particles and the resin is at least one selected from the group consisting of polypropylene, polyethylene, and polyvinylidene difluoride.

12. The porous insulator of claim 1, wherein polymer compound comprises polymerized units of tricyclodecane dimethanol diacrylate.

13. An electrode comprising:
   an electrode substrate;
   an electrode mixture overlying the electrode substrate, the electrode mixture comprising an active material; and
   the porous insulator of claim 1 overlying the electrode mixture.

14. The electrode of claim 13, wherein a part of the porous insulator is present in a part of the electrode mixture.

15. A nonaqueous power storage element comprising the electrode of claim 13.

16. A shutdown electrode obtained by overheating the electrode of claim 13.

17. The shutdown electrode of claim 16, wherein at least a portion of the solid particles is present in the communicating pores of the porous monolithic structure.

18. The shutdown electrode of claim 16, wherein at least a portion of the solid particles forms a coating layer over the active material.

19. A monolithic porous insulator, comprising:

a bicontinuous monolithic porous structure having a continuous network of communicating pores present in a solid matrix formed of a polymer compound and solid particles;

wherein the bicontinuous monolithic porous structure is formed by polymerizing a polyfunctional polymerizable compound in a mixture with solid particles and a porogen by a polymerization induced phase separation method to form a mixture of the polymer compound, the solid particles and the porogen, then removing the porogen; and wherein the solid particles have a melting point or glass transition temperature lower than that of the polymer compound.

20. A porous insulator, comprising:

a porous structure having communicating pores, wherein the porous structure comprises a polymer compound and has a bicontinuous structure; and a solid having a melting point or glass transition temperature lower than that of the polymer compound, wherein the porous structure is formed by polymerizing a polyfunctional polymerizable compound in a mixture with the solid and a porogen by a polymerization induced phase separation method to form a mixture of the polymer compound, the solid and the porogen, then removing the porogen;

wherein the bicontinuous structure is present in the entire porous insulator.

* * * * *